Patented July 21, 1936

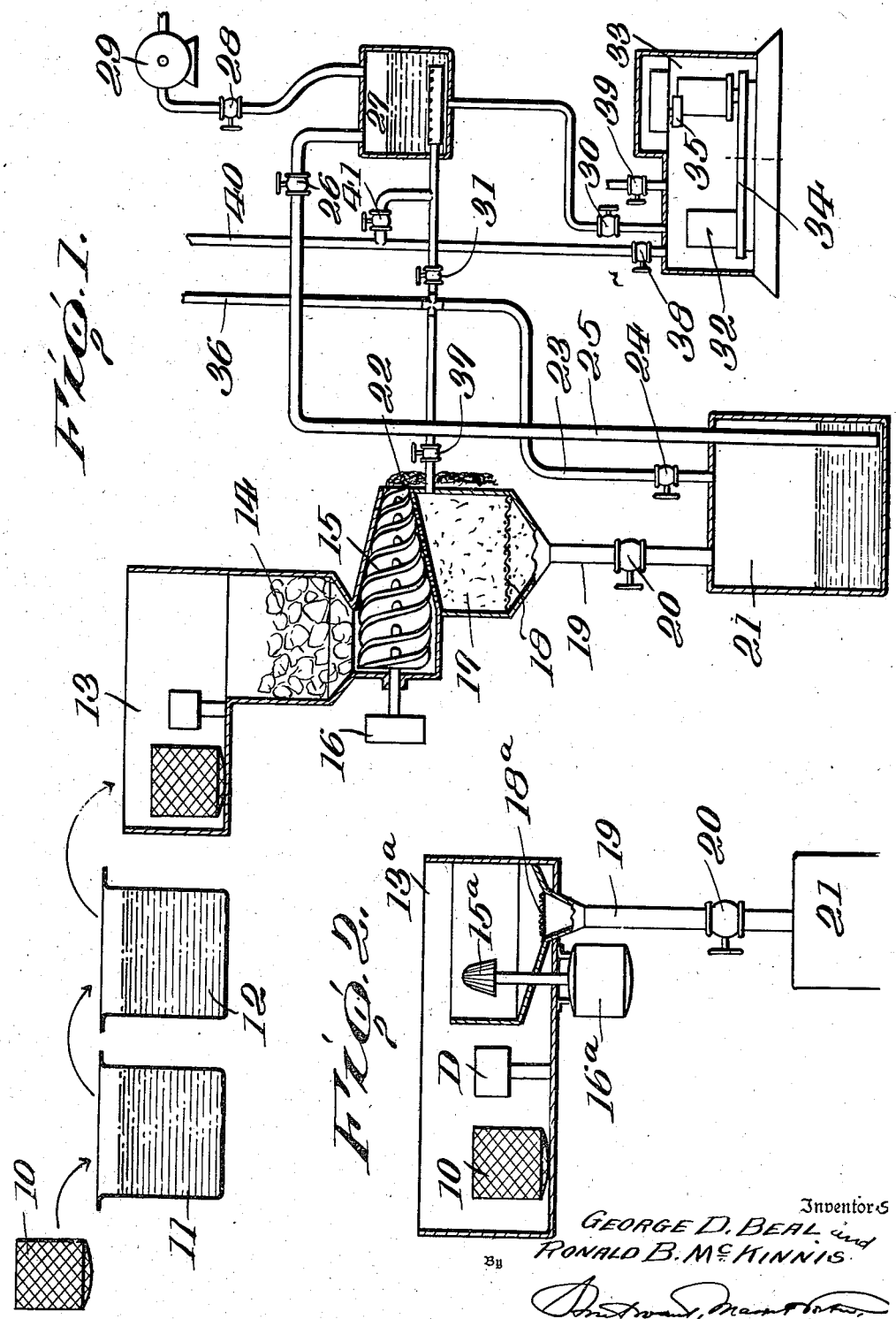

2,047,935

UNITED STATES PATENT OFFICE 2,047,935

METHOD OF PREPARING FRUIT JUICES

George D. Beal and Ronald B. McKinnis, Pittsburgh, Pa., assignors to Continental Can Company, Inc., New York, N. Y., a corporation of New York Application March 1, 1932, Serial No. 596,106

3 Claims. (Cl. 99—155)

This invention concerns fruit juices, and more particularly concerns the preparation and preservation of such juices without modification of the flavor or vitamin content of the juices.

The juices of various fruits are recognized as food stuffs containing substances beneficial to health. Oranges, lemons, tomatoes, etc., contain among other substances the anti-scorbutic vitamin known as vitamin C. It is however necessary that neither the flavor nor the vitamin content be injured in the processes of preparation and delivery. Very short exposure of such juices to the action of bacteria and/or oxidizing gases causes marked deterioration which is not abated by later sterilization or exclusion of such gases. Further, it is found that chemical preservatives and heat operate deleteriously upon the juices while the use of refrigeration restricts distribution of the juices to points near storage refrigerators.

The whole fruit with unbroken capsule or skin preserves the vitamin content substantially unchanged. Various agencies are markedly destructive of the quality of such juices, comprising (1) oxidation by atmospheric oxygen; (2) the action of enzymes normally present in the fruit but remaining inactive so long as the skin is unbroken; and (3) the life process of yeasts, molds and bacteria. Since the pulp and juices of citrus and other fruits are bacteriologically sterile as long as the fruit skin is unbroken, it is essential on the one hand to maintain this sterility by preventing contamination, and on the other hand to sterilize the fruit skin itself and to maintain a sterile and oxygen-free atmosphere during the disintegration of the fruit for the purpose of juicing. The juice obtained during disintegration is then transferred aseptically into a sterile container and this container is hermetically sealed to prevent contamination.

According to the present process, the fruit skin or rind is sterilized prior to disintegration by a heat treatment preferably accompanied by a chemical treatment. This treatment is continued for a period long enough to destroy the surface organisms, but is interrupted before the pulp proper has been appreciably heated. The whole fruit is immediately immersed in a sterile cooling bath, and thereafter disintegrated for the extraction of the juice.

The accompanying drawing shows illustrative examples in diagram of apparatus by which the present invention may be practiced.

Figure 1 shows diagrammatically the apparatus and procedure for producing and preserving the juice of a fruit which may be disintegrated and its juice extracted in an auger press.

Figure 2 is a fragmentary view showing a reamer type of extractor, which may be employed for extracting juices from citrus and like fruits.

In the drawing, the fruit is filled into a basket or similar container 10 which is then immersed with its contents in a vat 11 containing a hot sterilizing solution such as sodium hypochlorite or hypobromite or iodine, corresponding in concentration to one ounce of sodium hypochlorite in one gallon of water. When the temperature of this solution is 212 degrees F., an immersion of oranges for two minutes will cause a definite surface sterilization, but without a transfer of heat through the rind sufficiently to cause an appreciable heating of the juice-containing pulp. The temperatures and times may be varied according to the character of the fruit and the nature of the infection. The use of water at temperatures above 212 degrees F., and at pressures above atmospheric, or of superheated steam, with or without the addition of sterilizing agents, will increase the rate of surface penetration and materially shorten the time required for sterilization.

Immediately following this sterilization, the basket and contents are preferably withdrawn and immmediately placed in a vat 12 containing sterile water at a temperature of say 50 degrees F., by which the heat in the fruit rind or peel is quickly withdrawn before the pulp is heated by conduction therefrom.

The individual fruits may then be withdrawn and cut or peeled as for example in a chamber 13 having a sterile and preferably non-oxidizing atmosphere and thence delivered into the hopper 14 of a fruit press 15 which is driven by a pulley 16 so that the fruit is disintegrated and its juices caused to drop into a sump 17 and pass through a strainer 18 for removing seeds and coarse pulp, while the juice flows down in a pipe 19 past the valve 20 into a storage tank 21. The substantially dry pulp residue 22 issues from the end of the fruit press in the usual manner.

From time to time as the juice accumulates in the storage tank, it is forced upward by pressure of a non-oxidizing or inert gas entering from the pipe 23 as controlled by a valve 24, through a delivery pipe 25 past a delivery valve 26 into a treating chamber 27. When this chamber is filled to the desired extent, with the discharge valve 30 closed, the valve 26 is closed and the valve 28 leading to the vacuum pump 29 is opened so that the contents of the treating chamber 27 are evacuated and thus oxidizing gas which has entered the fruit by normal respiration, or has accidentally come in contact with the fruit or juice during disintegration is withdrawn. The valve 28 is then closed and the valve 31 opened so that a non-oxidizing gas is forced through the liquid contents of the treating chamber 27 to saturate the fruit juice. Valve 31 is again closed and valve 28 opened to cause a new evacuation of the fruit juices, so that ultimately substantially all of the oxidizing gases have been withdrawn from the juices. The discharge valve 30 is then opened and the juice is permitted to flow in limited quantity into a sterile container such as the tin can 32 located in the filling and closing chamber 33. This chamber is preferably filled with an inert gas, and is illustrated as having a turntable 34 therein so that upon filling the ordinary container 32, it may be rotated around into position beneath a seaming head 35 and, the cover having been applied thereto, the container and its cover are seamed without leaving the closing chamber. Thereafter, a further movement of the turntable 34 permits withdrawal of the container in well known manner without breaking the seal of the filling and closing chamber. Such filling and closing chambers in which articles may be filled and sealed under vacuum or in a sterile atmosphere are well known in the art, and are not specifically claimed herein.

Conduits are provided for introducing inert non-oxidizing gas to the system, so that the juice, from the moment of its exposure by cutting is protected from the atmosphere. The trunk pipe 36 may lead from a source of carbon dioxide under suitable pressure to the valves 24 and 37 whereby to flood the sump, press, hopper and handling chamber 13, as well as for placing the liquid in the storage tank 21 under lifting pressure. The valve 31 permits the passage of carbon dioxide gas from this pipe 36 through the juice in the treating chamber 27. Likewise, conduits are provided for introducing non-oxidizing gas into the filling and closing mechanism past the control valve 38 thereof.

When the apparatus is first started, the valves 24, 31, 37 and 38 are open and the inert gas is caused to pass throughout the apparatus, displacing all air and other oxidizing gases that may be present in the apparatus. The vacuum pump 29 is preperably operated to assist in the withdrawal of the air while the valves 20, 26 and 38 are open as well as a valved vent 39 on the filling and closing chamber. When all air has been driven out of the apparatus, the operations of sterilizing and disintegrating the fruit and processing the juice may be begun. It will be noted that the fruit juice is maintained in a non-oxidizing atmosphere from the moment that the fruit is cut or peeled. The juice may absorb some of this non-oxidizing gas, when carbon dioxide is used for example, and is thus carried forward into the treating chamber with dissolved inert gas. The evacuation then employed during processing causes this dissolved inert gas to be withdrawn from the fruit juice, and to assist in sweeping away any dissolved oxidizing gas.

As inert gases may be employed any gas or vapor which does not tend to oxidize the juices under the conditions of the operation. Carbon dioxide, hydrogen and nitrogen have been successfully employed.

A preferred procedure for the treatment of orange juice, for example, after it has been extracted and brought into the treating chamber 27, is as follows:

The juice is first avacuated by the pump 29, and then a soluble gas such as carbon dioxide is admitted and caused to bubble upward through the juice, by opening valve 31. During this operation, the carbon dioxide gas serves to displace or "wash out" any oxygen which may be present. However, the carbon dioxide gas is itself dissolved to some extent in the juice. Valve 31 is again closed, and a new evacuation accomplished, to remove any residue of oxidizing gas, and most of the carbon dioxide.

In Figure 1, the pipe line 40 is connected to a container of an inert and non-soluble gas such as nitrogen. Upon opening valve 41, such gas is caused to bubble upward through the juice in the treating chamber 27 and thus to displace the carbon dioxide in turn, but without itself dissolving to any appreciable extent in the juice.

It may be remarked that during this employment of carbon dioxide, followed by an insoluble gas, the carbon dioxide appears to exert a greater effect in removing the oxygen than nitrogen would do: while the subsequent use of insoluble gas accomplishes a substantially complete elimination of the carbon dioxide, so that the closed cans are definitely not subject to bulging later. If desired, the juice may be again evacuated after bubbling the nitrogen therethrough. It will be understood that any desired degree of evacuation may be employed at the several stages, and in some instances one or more evacuation phases may be dispensed with.

It is obvious that the sterile and non-oxidized juice may be packed in another manner than by filling into a container and sealing. Thus it may be frozen and preserved out of contact with air, placed in containers and maintained under pressure of a non-oxidizing gas, or filled into a container and sealed in vacuum or frozen.

The process is adapted to the preparation of the juice of any fruit which can be extracted, as for example citrus fruits, tomatoes, apples, pineapples, and the like, and any type of sterilizing, cutting, peeling, and/or juice extracting mechanism may be employed without modifying the essential steps employed.

In Figure 2, a treating chamber 13a is shown to include the cutting devices D for halving oranges for example, along with a reamer 15a driven by a motor 16a and serving for removing the juice and pulp from the orange halves. This juice runs downward as in the structure of Figure 1, past a screen 18a and into the pipe 19, and thence by valve 20 to the storage chamber 21. The treatment of the orange juice may follow the procedure outlined above.

It will particularly be remarked that the present procedure and apparatus does not heat the juice itself, and that steps are taken to avoid such heating, since thereby a modification of the juice by thermal effects is avoided. The procedure is accomplished, from the moment of cutting until following the final closure of the container, in the absence of air or other oxidizing medium: and in apparatus which may be maintained sterile, and may readily be cleaned by scalding, etc., in the usual manner.

It is obvious that many changes may be made without departing from the scope of the appended claims.

Having thus described the invention, what we claim as new and desire to secure by Letters Patent, is:

1. The method of extracting juices of fruits having enclosed rinds and sterile juice therein and packaging the same in hermetically closed containers in their natural sterile condition, consisting in sterilizing the surface of the whole fruit while maintaining the body thereof substantially at normal atmospheric temperature, parting the rind and separating the juice from the fruit in the presence of a sterile non-oxidizing atmosphere, transferring the fruit juice to a container suitable for marketing the juice in which has been created a sterile non-oxidizing atmosphere and hermetically closing the same, and maintaining said juice in the presence of a sterile non-oxidizing atmosphere and at a temperature insufficiently high to affect the flavor and vitamin content of the juice from the time the rind is parted until the juice is sealed in the container.

2. The method of extracting juices of fruits having enclosing rinds and sterile juice therein and packaging the same in hermetically closed containers in their natural sterile condition, consisting in sterilizing the surface of the whole fruit while maintaining the body thereof substantially at normal atmospheric temperature, parting the rind and separating the juice from the fruit in the presence of a sterile non-oxidizing atmosphere, transferring the fruit juice to a closed chamber, passing a sterile non-oxidizing gas through the separated juice in the closed chamber for removing therefrom the oxygen content present in the fruit before the separation of the juice therefrom, transferring the juice from said closed chamber to a container suitable for marketing the juice in which has been created a non-oxidizing atmosphere and hermetically closing the container, and maintaining said juice in the presence of a sterile non-oxidizing atmosphere and at a temperature insufficiently high to affect the flavor and vitamin content of the juice from the time the rind is parted until it is sealed in the container.

3. The method of extracting juices of fruits having enclosing rinds and sterile juice therein and packaging the same in hermetically closed containers in their natural sterile condition, consisting in sterilizing the surface of the whole fruit while maintaining the body thereof substantially at normal atmospheric temperature, parting the rind and separating the juice from the fruit in the presence of a sterile non-oxidizing atmosphere, transferring the fruit juice to a closed chamber, passing carbon dioxide gas through the separated juice in the closed chamber for removing therefrom the oxygen content present in the fruit before the separation of the juice therefrom, passing nitrogen through the juice for removing therefrom a greater portion of the carbon dioxide gas, transferring the juice from the closed chamber to a container suitable for marketing the juice in which has been created a non-oxidizing atmosphere and hermetically closing the container, and maintaining said juice in the presence of a sterile non-oxidizing atmosphere and at a temperature insufficiently high to affect the flavor and vitamin content of the juice from the time the rind is parted until it is sealed in the container.

GEORGE D. BEAL.
RONALD B. McKINNIS.